United States Patent [19]
Jursich et al.

[11] Patent Number: 5,897,847
[45] Date of Patent: Apr. 27, 1999

[54] METHOD FOR EXTENDING THE GAS LIFETIME OF EXCIMER LASERS

[75] Inventors: Gregory M. Jursich, Clarendon Hills; William A. Von Drasek, Oak Forest, both of Ill.

[73] Assignee: American Air Liquide, New York, N.Y.

[21] Appl. No.: 08/114,285

[22] Filed: Sep. 1, 1993

Related U.S. Application Data

[63] Continuation of application No. 07/665,240, Mar. 6, 1991, abandoned.

[51] Int. Cl.$^6$ .................................................. G01B 13/00
[52] U.S. Cl. ..................... 423/219; 423/240 R; 372/59
[58] Field of Search .................. 372/59; 423/437 R, 423/219, 240 R, 416

[56] References Cited

U.S. PATENT DOCUMENTS

| | | | |
|---|---|---|---|
| 4,392,888 | 7/1983 | Eckert et al. | 75/407 |
| 4,796,271 | 1/1989 | Christensen, Jr. et al. | 372/59 |
| 5,090,020 | 2/1992 | Bedwell | 372/59 |

FOREIGN PATENT DOCUMENTS

| | | |
|---|---|---|
| 424809 | 9/1974 | U.S.S.R. . |

OTHER PUBLICATIONS

Excimer Lasers=Current Trends and Future Directions Jan. 1989 J. Reid et al. pp. 1–8 presented at Spie O–E/Lase '89.
Laser Focus World pp. 1–4, "Chemistry studies to improve excimer gas lifetimes" Jursich et al. Jun. 1989.
"Gas Contaminants Produced in Electron–Beam–Pumped XeF Lasers" pp. 2121–2125, presented at Conf. on Lasers and Electro–optics May 12–17 1991 Kimura et al..
"Gas Contaminant effects in discharge-excited KrF lasers" Applied Optics vol. 31 No. 12 Apr. 1992.

*Primary Examiner*—Michael Lewis
*Assistant Examiner*—Stuart L. Hendrickson
*Attorney, Agent, or Firm*—Oblon, Spivak, McClelland, Maier & Neustadt, P.C.

[57] ABSTRACT

A method for extending the gas lifetime of an excimer laser by removing $CF_4$ impurity, which comprises:

a) reacting $CF_4$, an undesirable impurity which forms and is contained in the lasing gases, with an amount of an oxidizing gas additive effective to produce one or more compounds which are condensible with refrigeration means, without reducing laser output below a predetermined acceptable level; and b) condensing said one or more compounds produced in step a) with refrigeration means, substantially without condensing said one or more rare gases therewith, thereby removing said $CF_4$ impurity from said excimer laser and extending the gas lifetime of the laser.

10 Claims, 1 Drawing Sheet

METHOD FOR EXTENDING THE GAS LIFETIME OF EXCIMER LASERS

This application is a Continuation of application Ser. No. 07/665,240, filed on Mar. 6, 1991, now abandoned.

BACKGROUND OF THE INVENTION

1. Field of the Invention

The present invention relates to a method for extending the gas lifetime of excimer lasers.

2. Description of the Background

Excimer lasers represent an extension of laser technology into the ultraviolet portion of the spectrum. Excimer lasers offer the capability for pulsed short ultraviolet wavelength systems with very high peak power. An excimer is a compound that has no stable ground state and exists as a bound molecule only in electronically excited states. Many excimer lasers utilize the noble gases, which generally do not form stable chemical compounds. For example, the krypton fluoride laser is a prime example of an excimer laser. In such a laser, a gas mixture containing krypton and fluorine is irradiated with high energy electrons to produce the metastable excited state of KrF* excimer which is temporarily bound. The molecule dissociates according to the reaction:

$$KrF \rightarrow Kr + F + h\upsilon$$

As there is no stable ground state, a population inversion is readily produced. Due to the nature of the reaction, excimer lasers are generally pulsed devices, with pulse durations on the order of nanoseconds.

Excimer lasers are now available commercially. Commercial excimer lasers require gas mixtures consisting of rare gases, such as He, Ne, Ar, Kr or Xe, and halogen donors, such as $F_2$, $NF_3$ or HCl. The particular components of the gas mixture used depend upon the particular lasing transition of interest. XeCl, KrF, ArF and XeF are examples of lasing transitions used today. However, XeCl, KrF and ArF, which operate at 308, 248 and 193 nm wavelengths, respectively, are the most widely used.

For KrF operation, the rare gases used in the laser chamber are Kr diluted in He or Ne along with a halogen donor which can be either $F_2$ or $NF_3$. $NF_3$ is a better energy acceptor, but $F_2$ is used in all commercial excimer lasers today because post-discharge recombination kinetics are more favorable for $F_2$ in terms of minimizing gas degradation. The same applies to ArF with the exception that Ar replaces Kr, and ArF operation is more susceptible to gas degradation.

Excimer lasers are unlike any other gas laser as they generally operate with a fixed volume of gas which needs replacing often enough to make it mandatory for the user to either refill the laser chamber or purify and replenish the halogen donor. The need to replenish gas mixtures for excimer lasers is a result of undesirable chemical reactions occurring inside the laser chamber. As a consequence of these reactions, the gas mixture changes during operation of the laser and the laser output decreases. The characteristic feature of such gas degradation is loss of halogen donor and formation of gaseous impurities. Despite improvements in laser design to minimize gas degradation, there continues to be strong interest in extending the gas lifetime of excimer lasers. There are two important reasons for this. First, and most importantly, there is a need to minimize downtime of laser operation. Second, there is a need to reduce gas consumption of the expensive rare gases such as Ne, Kr and Xe.

Over the years, there have been a number of attempts to extend the continuous operational period of excimer lasers. In one method, partial gas replacements are performed during laser operation. In this case, the gas mixture in the laser is simply replaced slowly, in discrete but small steps, while maintaining operation. This method does eliminate laser downtime, however, it does not reduce gas consumption, and it adds to the gas handling hazards as cylinders of toxic halogen donor gas must remain open.

A second method involves adding small amounts of halogen donor gas during laser operation. While this approach can effectively replace halogen donor, it does not remove impurities in the gas which limit the useful gas lifetime.

Several methods are known for removing impurities in excimer lasers. Many of these methods utilize metal getter systems and molecular sieves which work on removing all gaseous species in the mixture except rare gas. In order to take advantage of the purified gas using such a method, the halogen donor is simply replaced prior to flowing this gas back into the laser chamber so that gas consumption is limited to halogen donor only. Devices utilizing this principle are commercially available, however, they are extremely expensive and require complex gas handling. A more economical approach, and thus most common in the field, entails the use cryogenic purification of the laser gas. This methodology takes advantage of the fact that many of the impurities resulting from gas degradation can be removed in a low temperature trap. To be sure, gas lifetimes of excimer lasers have been extended considerably using this technique on-line during KrF and ArF operation.

Unfortunately, the use of cryogenic purification on KrF operation, for example, is limited in that the lowest temperature allowable for on-line use is about $-180°$ C. below that at which one begins to reduce sufficient Kr in the gas mixture, which decreases laser output. This results in an inability to remove an important impurity, $CF_4$, from the laser chamber, which limits the gas lifetime of KrF operation when cryogenic purification is used. For ArF, a cryogenic trap can be used at lower temperatures of around about $-196°$ C., which is sufficient to condense out more $CF_4$. However, at such lower temperatures, a higher cooling capacity is required from the cryogenic trap.

Thus, a need continues to exist for a method of extending the gas lifetime of excimer lasers in an effective, but economic manner.

SUMMARY OF THE INVENTION

Accordingly, it is an object of the present invention to provide a method for extending the gas lifetime of excimer lasers.

It is also an object of the present invention to provide a method of removing $CF_4$ impurity from gas mixtures used in excimer lasers.

Further, it is a particular object of the present invention to provide a method for extending the gas lifetime of XeF, ArF and KrF excimer lasers.

Accordingly, the above objects and others are provided by a method for extending the gas lifetime of excimer lasers, which entails:

a) reacting $CF_4$, an undesirable impurity which forms and is contained in the lasing gases, with an amount of an oxidizing gas effective to produce one or more compounds which are condensible with refrigeration means, without reducing laser output below a predetermined acceptable level; and b) condensing said one or more compounds produced in step a) with refrigeration means, substantially without condensing said one or more rare gases therewith, thereby removing said $CF_4$ impurity and extending the gas lifetime of the laser.

DETAILED DESCRIPTION OF THE PREFERRED EMBODIMENTS

Figure 1:
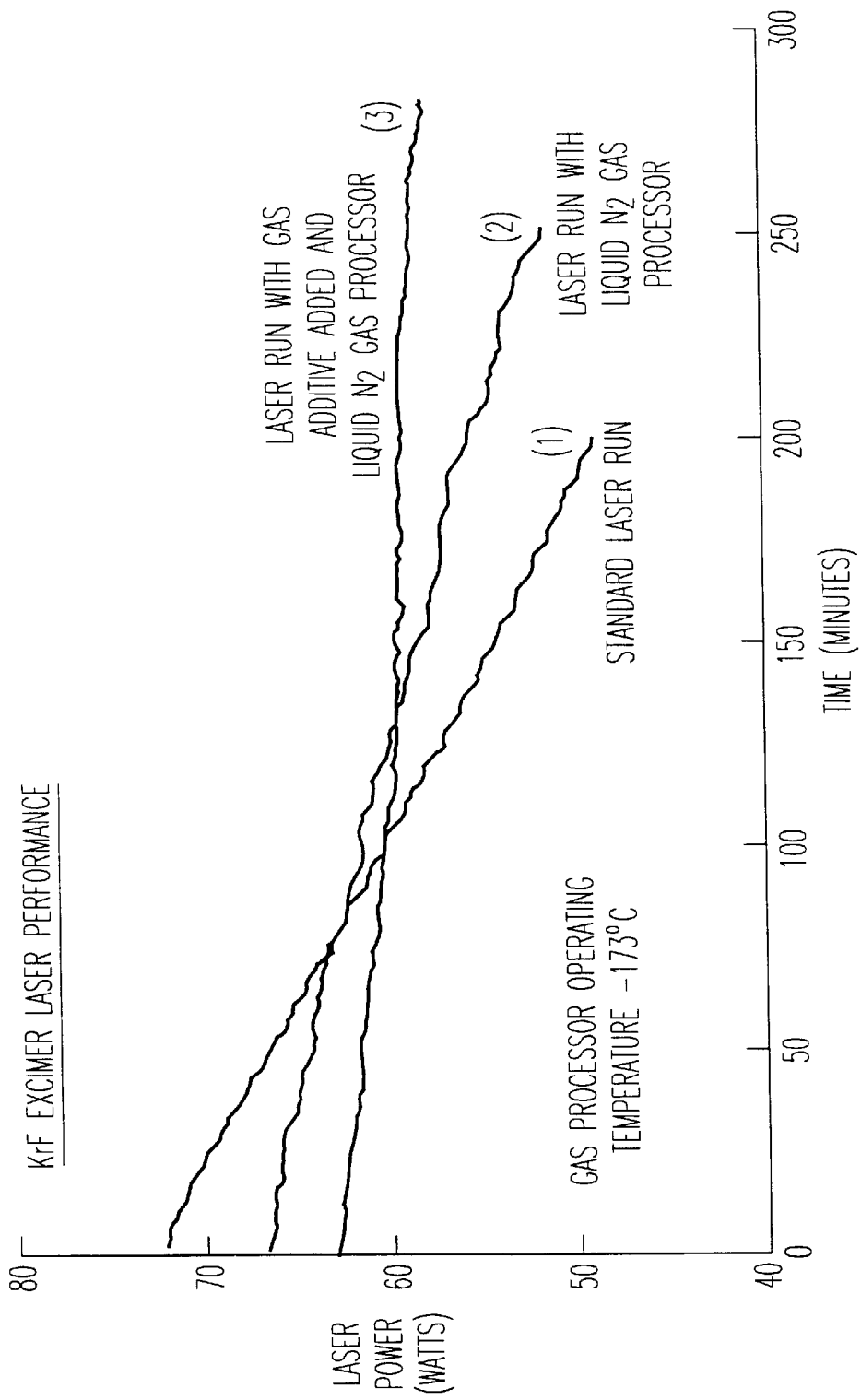
FIG. 1 illustrates the effect of the present gas additive on KrF excimer laser performance.

In accordance with the present invention, it has been discovered that by adding an additional oxidizing gas component, such as $O_2$, air, or even $OF_2$, to a typical excimer laser gas mixture, the gas lifetime of the excimer laser can be extended when using cryogenic purification. It has been discovered that in the presence of a gaseous plasma or discharge, such an oxidizing gas additive reacts with $CF_4$ impurity to form other lower vapor pressure carbon species which can be effectively removed by a cryogenic trap.

Furthermore, depending on the laser construction materials used, $O_2$ may also function as an impurity which can limit the gas lifetime of the excimer laser with cryogenic purification. In that case, small amounts of $CF_4$ may be added which, through similar reactions, form gaseous impurities which are easily removed by a cryogenic trap.

The present invention provides, in part, a method for extending the gas lifetime of an excimer laser by removing $CF_4$ impurity, which entails:

a) reacting $CF_4$, an undesirable impurity which forms and is contained in the lasing gases, with an amount of an oxidizing gas effective to produce one or more compounds which are condensible with refrigeration means, without reducing laser output below a predetermined acceptable level; and b) condensing said one or more compounds produced in step a) with refrigeration means, substantially without condensing said one or more rare gases therewith, thereby removing said $CF_4$ impurity from the excimer laser and extending the gas lifetime thereof.

The present invention also provides, in part, a method for extending the gas lifetime of an excimer laser by removing $O_2$ impurity, which entails:

a) reacting $O_2$, an undesirable impurity which forms and is contained in the lasing gases, with an amount of $CF_4$ to produce one or more compounds which are condensible with refrigeration means, without reducing laser output below a pre-determined acceptable level; and b) condensing the one or more compounds produced in step a) with refrigeration means, substantially without condensing the one or more rare gases therewith, thereby removing the $O_2$ impurity from the excimer laser and extending the gas lifetime thereof.

The difficulty of removing $CF_4$ impurity from excimer gas mixtures, such as XeF, KrF or ArF gas mixtures, results from the relatively high vapor pressure of $CF_4$ relative to the rare gases Kr and Xe, and even Ar, as well as the chemical inertness of $CF_4$. In accordance with the present invention, a high energy source such as a plasma or electrical discharge is used to deposit sufficient energy into the gas mixture to allow reaction between $CF_4$ and the oxidizing gas additive. The resulting products, typically $CO_2$ and $COF_2$, can then easily be cryogenically removed without removing the rare gas. The source of plasma can be the electric discharge in the laser, itself, or it can be a plasma or a discharge system located external to the laser chamber. In the latter case, the laser gas mixture circulates through the plasma system and cryogenic trap prior to returning to the laser chamber. As noted above, the source of the oxidizing gas may be supplied as gaseous air, $O_2$ or NO or even $OF_2$, however either $O_2$ or air are preferred. Further, the oxidizing additive may also be added to the laser gas mixture by means of chemical or plasma deterioration of solid materials containing oxygen or oxygen atoms, or from permeation or surface desorption of materials containing oxygen or oxygen atoms.

For example, a permeation source of oxidizer may be used whereby a commercially available permeation tube is placed on the gas supply line of the laser. Such devices comprise a reservoir of gas or liquid, such as $O_2$ or another oxidizer, behind a permeable membrane. As another gas flows across the membrane external to the reservoir, the material in the reservoir permeates through the membrane and enters into the gas flow. In this case, the oxidizer gas would be added to the flow of gas used in filling the laser vessel with its nominal gas constituents.

Alternatively, as an example of a reactive source of oxidizer, which decomposes by chemical or plasma deterioration, mention may be made of metal oxide compounds, such as $Al_2O_3$. In particular, a small amount of the metal oxide compound is placed inside the gas supply line of the laser. As the laser is filled with the fluorine mixture, a portion of the $F_2$ will react with the metal oxide to form oxygen in the gas stream and a non-volatile metal fluoride. The necessary control over the amount of oxidizer added is effected by adjusting the flow rate of the gas stream, and the amount of exposed surface area. Notably, however, any metal oxide may be used as long as it is capable of reacting with fluorine to produce oxygen gas. Such compounds are well known to those skilled in the art.

The present invention is quite advantageous as the gas lifetime of excimer lasers can be extended without resorting to expensive metal getter purification methodologies or complex gas handling. While the concept of using an oxidizing gas additive to extend excimer gas laser operation has proven advantageous, such a methodology may also be applied to other processes in which $CF_4$ must be removed from rare gases, such as Xe, Kr or Ar or addition of $CF_4$ for removal of $O_2$ from rare gases or, more advantageously, from $F_2$, itself.

The present invention may be used to improve the gas lifetime of excimer lasers generally. However, the present invention is particularly advantageous for extending the gas lifetime of XeF, KrF and ArF excimer lasers. The present invention is most advantageous in extending the gas lifetime of KrF excimer lasers due to the increased difficulty of removing $CF_4$ with the cryogenic trap without removing KBr. For example, it has been found that with ArF excimer lasers, more of the $CF_4$ can be removed by a cryogenic trap due to the low cryogenic trap temperatures for ArF systems. When using XeF excimer lasers, by contrast, it is necessary to use trap temperatures of not less than $-150°$ C. in order to avoid removal of Xe. This results in a relatively large amount of unremoved $CF_4$ which remains in the lasing gases.

The present invention may also be utilized in cases where the gas lifetime limiting impurity is $O_2$, instead of $CF_4$. In this case, $CF_4$ may be used to consume $O_2$, to form other impurities which can be cryogenically trapped out. Whether $O_2$ or $CF_4$ is the limiting impurity will depend upon the construction materials used in the laser. Given the common materials used in these lasers, $CF_4$, and not $O_2$, is the impurity which most commonly limits the gas lifetime of the laser.

The present invention is also advantageous in that the reaction between the oxidizing gas additive and $CF_4$ leads to the formation of additional $F_2$ which is the active halogen donor in lasers such as XeF, KrF or ArF lasers. Hence, by using this inert, non-toxic additive, it is possible to decrease the need for a $F_2$ feed gas mixture in such excimer lasers. In fact, it is well known that use of $CF_4$ and $O_2$ after sufficient exposure to discharge or plasma can generate appreciable amounts of $F_2$. For example, this is commonly done in semiconductor etching processes where $CF_4$ and $O_2$ plasma is used, which generates $F_2$ and F atoms to etch silicon.

In accordance with the present invention, the oxidizing gas additive used to reduce $CF_4$ accumulation in the excimer laser operating with cryogenic purification must be present in small amounts as too much additive will decrease laser power to a level which is unacceptable for the user. Yet, to be effective in consuming $CF_4$, there must be a comparable amount of oxidizing gas additive present. Essentially, two molecules of $O_2$ will react with three molecules of $CF_4$. However, the precise stoichiometry will depend upon the operating conditions employed.

In accordance with the present invention, it is necessary that a sufficient amount of either oxidizing gas additive or $CF_4$ be used to remove either $CF_4$ or $O_2$, respectively. However, the amount used must not be such so as to cause an unacceptable loss in laser output. Generally, the acceptable level of power loss will be determined by the particular application and the power of the laser being used.

For example, given the loss of power output effect of $O_2$ and $CF_4$ measured in a KrF laser, for about a 20% maximum power loss, $O_2$ cannot exceed about 400 ppm and $CF_4$ must remain under about 1,000 ppm. In accordance with the present invention, it has been found that the preferred concentration range of $O_2$ is about 50 to 350 ppm, even more preferably about 100 to 300 ppm, provided a 30% power loss is acceptable, in exchange for more constant output power.

Similarly, to be effective in consuming $O_2$, there must be comparable amount of $CF_4$ present. The preferred concentration is about 50 to 700 ppm of $CF_4$, with a more preferred amount of about 100 to 600 ppm present for the same 30% power loss limit.

Whether $CF_4$ is used to consume excess $O_2$, or the oxidizing gas is used to consume excess $CF_4$, the exact optimum concentration needed for the additive depends on the materials of laser construction, particularly its specific susceptibility to the oxidizing gas and $CF_4$, as well as the efficiency of the cryogenic trap used and the rate of gas circulation through the trap.

In general, the artisan will determine the acceptable level of power loss. This is then used, in turn, to ascertain the amount of oxidizing gas additive or $CF_4$ which should be used in order to effectively remove $CF_4$ or $O_2$, respectively. The above examples of preferred ranges of $O_2$ as the oxidizing gas and $CF_4$ concentration are provided in conjunction with a 30% power loss. However, this is only for purposes of illustration and is by no means intended to be limitative. For example, the artisan may determine, depending upon the intended use, that only a 10% or 20% power loss for the KrF laser is acceptable. Likewise, a 40% power loss may be acceptable. In any event, the determination of acceptable power loss is within the skill of the artisan. Generally, the greater the power loss which can be accepted, the greater the concentration of $O_2$, for example, which can be used. For example, if a 30% power loss is acceptable, up to about 400 ppm of $O_2$ may be tolerated. If however, a 40% power loss is acceptable, an even higher concentration of $O_2$, i.e., such as about 600 ppm, may be tolerated.

Regardless of whether the source of the gas additive is the oxidizing as or $CF_4$, the simplest source is a gas source external to the laser chamber. However, a gas source may also be provided from chemical or discharge reactions from within the laser or by using permeable materials which release $O_2$, for example, or $CF_4$. Any of these gas sources may be used as long as the concentration tolerance is not in excess following the above guidelines.

Typically, the excimer laser is operated at a lasing gas pressure of from about 1 atm. to about 9 atm. pressure. It is preferred, however, that a pressure be used which is in excess of 1 atm. to up to about 4 atm., particularly for KrF and ArF excimer lasers. The oxidizing gas additive may be added directly to the excimer laser or its circulation system from an external source.

As refrigeration means, a commercially available cryogenic trap can be used. However, other refrigeration means may also be used. For example, it is well known that cryogenic temperatures can be attained with commercially available refrigerator systems operating by the expansion and compression of helium. Such a refrigeration system may be used instead of a cryogenic trap utilizing a cryogenic trap.

As noted previously, a high energy source such as a plasma or electrical discharge is used to deposit sufficient energy into the gas mixture to promote reaction between $CF_4$ and the oxidizing gas mixture. The resulting products, such as $CO_2$ and $COF_2$, are cryogenically removed without removing rare gas. The source of plasma can be the electric discharge in the laser, itself, or it can be a plasma or a discharge system located external to the laser chamber.

Further, although the oxidizing gas additive may be added directly to the laser gas mixture from an external source if a commercially available laser is used, it is also possible to accomplish this by means of chemical or plasma deterioration of solid materials containing oxygen or oxygen atoms. Also, the oxidizing gas additive may be added by means of permeation or surface desorption of materials containing oxygen or oxygen atoms.

In the event that the latter two means are used to introduce the oxidizing gas additive (by chemical or plasma deterioration or by permeation or surface desorption of materials containing oxygen or oxygen atoms), a commercially available excimer laser can be modified to accomplish this result. Suitable substances which are known to be subject to chemical or plasma deterioration or permeation or surface desorption may be included inside the lasing chamber, in the circulation system or even in the gas delivery system.

In the event that $CF_4$ is added to remove $O_2$ impurity from the gas mixture, the $CF_4$ may be added from an external source.

The present invention will now be further illustrated by reference to an example which is provided solely for purposes of illustration and is not intended to be limitative.

EXAMPLE

A commercial discharge pumped KrF excimer laser was operated under three sets of conditions:

1) a typical KrF gas mixture ($F_2$, Kr and Ne) without any gas additive, 2) the same gas mixture as in (1), but with cryogenic purification of the gas mixture performed by recirculating the gas mixture through a cold trap maintained at −178° C., and 3) the same gas mixture as in (2), but with 150 ppm of $O_2$ added to the gas mixture at the start of the operation.

By reference to FIG. 1, it is seen that the power of the laser decreases at the slowest rate when the gas additive is present. In fact, the rate of power loss is reduced by a factor of 2, when the $O_2$ is present with cryogenic purification (3) as compared to where purification is used without $O_2$ (2).

The $O_2$ additive in the above example was added to the laser chamber prior to operation. However, it may also be added in small amounts, either continuously or in discreet steps, during the operation of the laser. As long as the $O_2$ is added in such a way the $O_2$ concentration in the laser does not increase beyond the point where the $O_2$, itself, lowers the laser output below the acceptable level for the user, any means of introducing the additive may be used. For example, if the acceptable level were 40% power loss, the maximum allowable $O_2$ concentration would be several hundred ppm. The actual limiting value would depend on the details of the laser construction and the requirements of the laser application.

In FIG. 1, it is seen that in the standard laser run (1), the laser power decreases by about 33% after only about 3 hours of operation. In the laser run with a liquid $N_2$ gas processor (cryogenic purification) (2), the laser power still decreases by about 25% after only about 4 hours of operation at 200 Hz.

By contrast, in the laser run with gas additive added ($O_2$) and which also uses a liquid $N_2$ gas processor (cryogenic purification) (3), the laser power decreases only about 5% even after almost 5 hours of operation at 200 Hz.

Thus, by virtue of the present invention, the gas lifetime of excimer lasers can be extended to a surprising extent without using expensive metal getter systems and molecular sieves.

Additionally, it is noted that when oxidizing gas additives other than $O_2$ are used, such as air, or even $OF_2$, or mixture thereof, an amount of gas additive is used such that approximately the same amounts of oxygen is present as disclosed herein. Thus, for example about twice as much $OF_2$ should be used as compared to $O_2$, or about five times as much air should be used. However, it is within the skill of the artisan to determine the precise amount required.

Finally, it is noted that the oxidizing gas additives or $CF_4$ used in accordance with the present invention may be easily obtained from a variety of commercial sources.

Having described the present invention, it will now be apparent to the artisan that many changes and modifications can be made to the above-described embodiments while remaining within the spirit and the scope of the present invention.

What is claimed as new and desired to be secured by Letters Patent of the United States is:

1. A method of extending the continuous operating life of an excimer laser containing a lasing gas or gas mixture selected from the group consisting of XeF, KrF and ArF, by removing an amount of $CF_4$ impurity therefrom during operation of said excimer laser, which is sufficient to minimize loss of laser power output and to extend the continuous operating life of said excimer laser, which comprises:

a) introducing oxygen into said lasing gas or gas mixture, and reacting said oxygen with said $CF_4$ impurity which accumulates in said lasing gas or gas mixture, said oxygen being introduced in an amount effective to produce one or more compounds which are condensable with refrigeration means; and b) condensing said one or more compounds produced in step a) in a cryogenic trap, with refrigeration means and at a temperature sufficient to condense said one or more compounds substantially without condensing said lasing gas or gas mixture therewith, thereby removing said $CF_4$ impurity from said lasing gas or gas mixture, thereby extending the operating life of the excimer laser.

2. The method of claim 1, wherein up to several hundred ppm of $O_2$ is used to react with said $CF_4$.

3. The method of claim 1, wherein from about 50–350 ppm of $O_2$ is used to react with said $CF_4$.

4. The method of claim 1, wherein said one or more compounds produced from the reaction of $CF_4$ and $O_2$ are selected from the group consisting of $CO_2$ and $COF_2$.

5. The method of claim 1, wherein said refrigeration means is a cryogenic trap which utilizes liquid nitrogen as a coolant.

6. A method of extending the continuous operating life of an excimer laser containing a lasing gas or gas mixture selected from the group consisting of XeF, KrF and ArF, by removing an amount of oxygen impurity therefrom during operation of said excimer laser, which is sufficient to minimize loss of laser power output and to extend the continuous operating life of said excimer laser, which comprises:

a) introducing $CF_4$ into said lasing gas or gas mixture and reacting said $CF_4$ with said oxygen impurity which accumulates in said lasing gas or gas mixture, said $CF_4$ being introduced in an amount effective to produce one or more compounds which are condensable with refrigeration means; and b) condensing said one or more compounds produced in step a) in a cryogenic trap with refrigeration means and at a temperature sufficient to condense said one or more compounds substantially without condensing said lasing gas or gas mixture therewith, thereby removing said oxygen impurity from said lasing gas or gas mixture, thereby extending the operating life of the excimer laser.

7. The method of claim 6, wherein up to about 1,000 ppm of $CF_4$ is used to react with said $O_2$.

8. The method of claim 6, wherein from about 100 to 600 ppm of $CF_4$ is used to react with said $O_2$.

9. The method of claim 6, wherein said one or more compounds produced from the reaction of $O_2$ and $CF_4$ are selected from the group consisting of $CO_2$ and $COF_2$.

10. The method of claim 6, wherein said refrigeration means is a cryogenic trap which utilizes liquid nitrogen as a coolant.

* * * * *